INVENTOR.
STEPHANE DUFAURE de LAJARTE

INVENTOR.
STEPHANE DUFAURE deLAJARTE
BY
*Bauer and Seymour*
ATTORNEYS

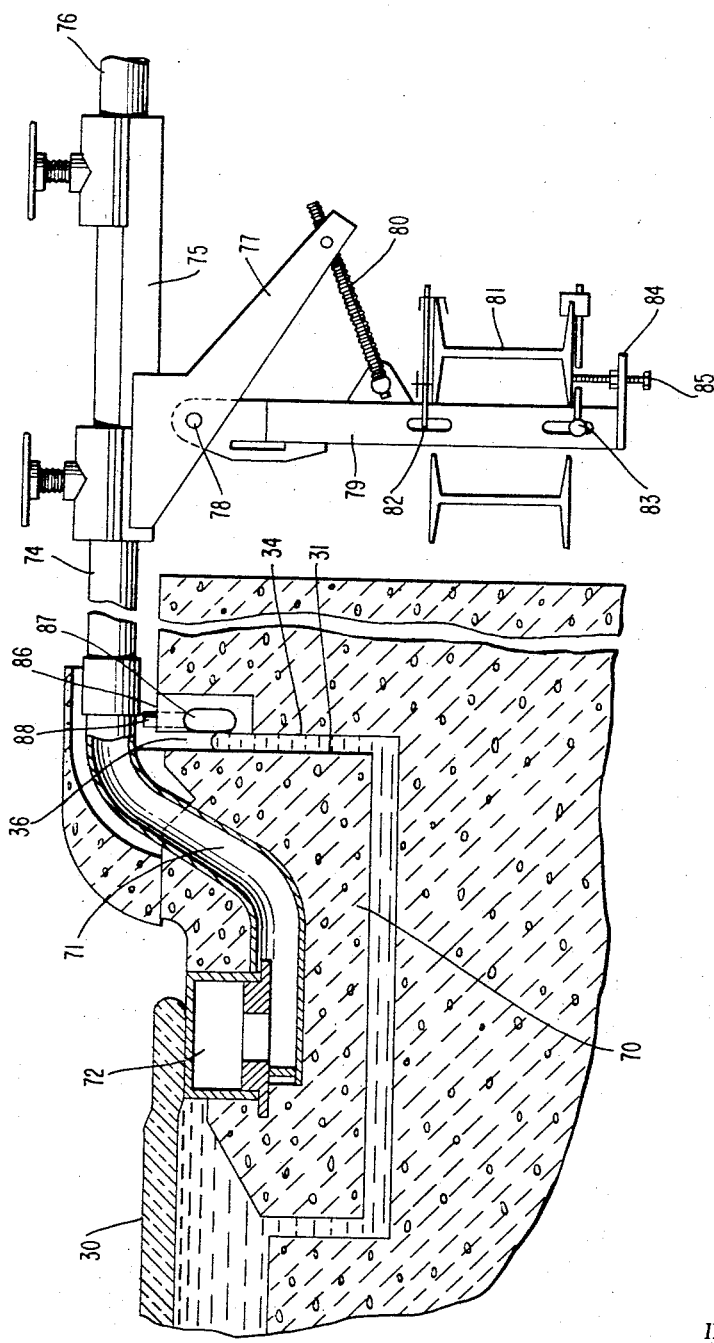

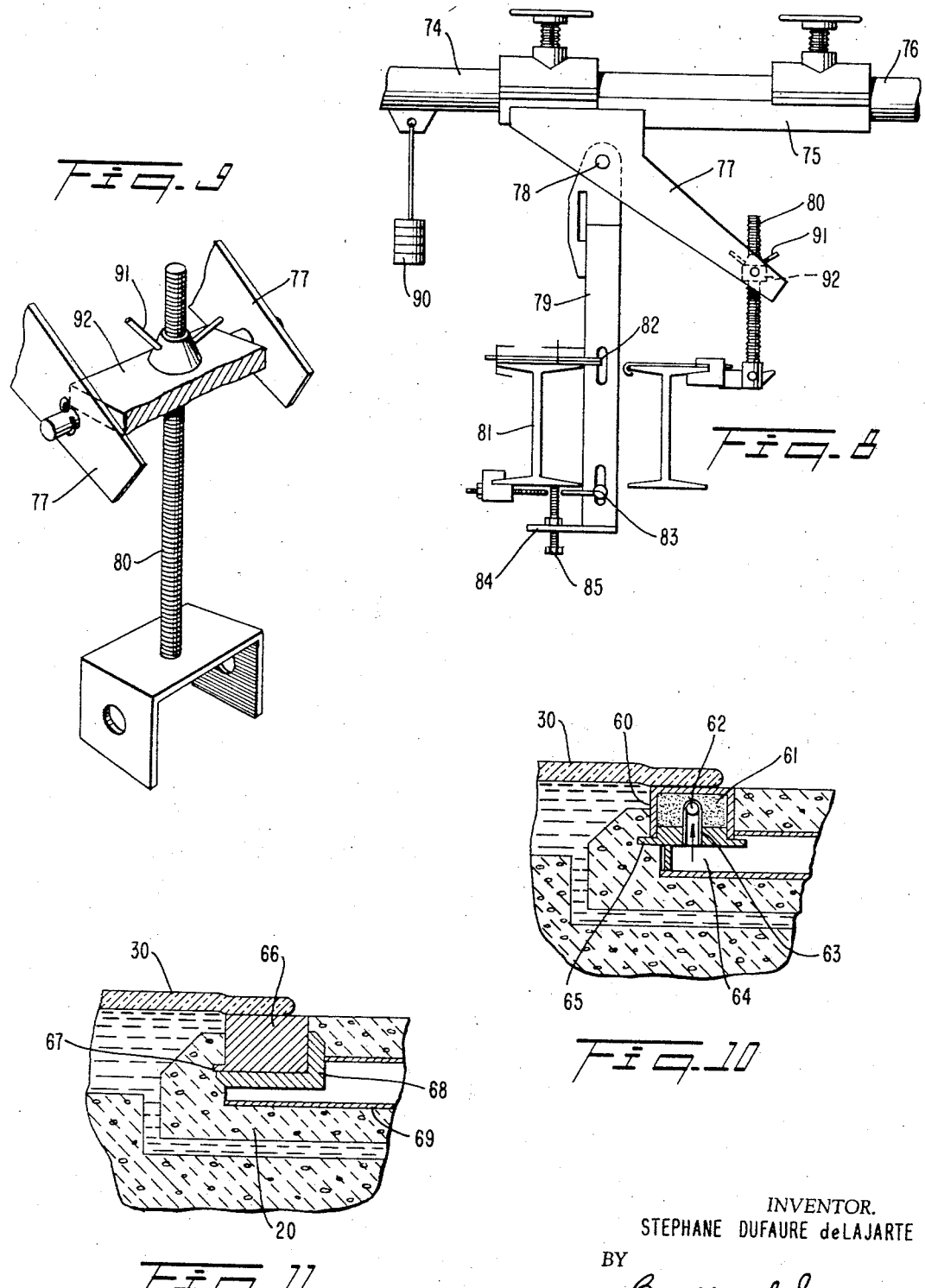

United States Patent Office 3,427,142
Patented Feb. 11, 1969

3,427,142
MANUFACTURE OF FLAT GLASS ON A MOLTEN METAL BATH
Stephane Dufaure de Lajarte, Paris, France, assignor to Compagnie de Saint-Gobain, Neuilly-sur-Seine, Haute-de-Seine, France
Filed June 28, 1965, Ser. No. 467,357
Claims priority, application France, July 1, 1964, 980,303/64; Apr. 30, 1965, 15,315/65
U.S. Cl. 65—65                      10 Claims
Int. Cl. C03b 18/02

ABSTRACT OF THE DISCLOSURE

Flat glass sheet is continuously made by the flotation process, the edges of the sheet resting on a series of individually adjustable, individually temperature-controllable supports which make it possible to locally vary the position of the boundaries of the flotation bath to perfect the handling of the sheet.

---

This invention relates to the manufacture of flat glass by a continuous process and to novel apparatus especially designed for the manufacture of glass sheets by the flotation process.

It pertains to improvements in the known method of manufacturing flat glass in which a sheet of glass is formed and deposited on the surface of a bath of molten metal, usually molten tin although the use of molten salt baths and baths composed of metal alloys is known. The novel process and apparatus relates to an improvement in the method of making sheet glass continuously by flotation. The original process allowed the sheet to assume its own dimensions under the forces of gravity and surface tension, but it was later proposed to exert control of the dimensions of the sheet, while it was flattened out and acquiring a fire polish, by laying the edges of the sheet on a solid support, but that process while ameliorating some of the problems inherent in the flotation process, had problems of its own. It was difficult to operate because the borders of the receptacle for the metal bath should be at the same level throughout the length of the bath, in order that the liquid shall form a supporting surface having a level equal to or higher than the borders without overflowing at any point. Even careful machining and leveling was scarcely equal to that task. It has also been equally difficult to cool the upper surfaces of the borders, those which make contact with the glass, sufficiently to prevent the glass from adhering to the material of the border, and it has been difficult to regulate the temperature of the borders with precision at different points along the length of the tank.

It is an object of the invention to control the level of the support over which the edges of the sheet are laid relatively to the level of the supporting liquid, to make adjustments in the level of the support without interrupting the manufacturing process if and when the level of the supporting liquid changes, and to make these adjustments locally.

It is another object of the invention to control locally the temperature of the borders of the glass sheet throughout the length of the tank.

It is another object of the invention to prepare apparatus of superior capacity and flexibility for making flat glass continuously by the flotation process.

The objects of the invention are accomplished generally speaking by a method of making glass sheet continuously which comprises forming the sheet and depositing its longitudinal edges on chilled, longitudinally extending, bearing surfaces while depositing its midportion upon a molten fluid mass which does not wet the bearing surfaces and adjusting the horizontal position of the bearing surfaces relatively to the level of the liquid supporting the midportion of the glass sheet; and by a tank for molten metal having movable side pieces extending along the tank, the tank and side pieces having opposed faces capable of establishing a capillary gap, and the side pieces being supported for movement in all directions.

According to the present invention a glass sheet is formed in one of the usual ways and laid on the metal bath with its edges passing in sequence onto a series of adjustable supporting elements, sometimes called bearings herein, which are partially immersed in the liquid and are aligned end to end in the metal along the side walls of the tank. These elements are movable individually. Because of this invention it has become possible to put the bearing supports which sustain the edges of the glass at a chosen level and to maintain between the two longitudinal bearings a liquid capable of supporting the central part of the glass sheet at its most favorable level. By this invention the horizontal level of these elements can be easily, precisely, and continuously maintained, even in a long tank, and different temperatures of the glass edges at different localities along the furnace can be maintained without ill effect, neither of which is practicable with the prior art apparatus having fixed edge supports for the glass and no method of varying the position of the glass-supporting bearings.

The space between the elements and between them and the wall of the tank is made so small as to produce, by capillarity and surface tension, a difference of level of the meniscus formed between the tank and the border elements and the level of liquid under the glass. This is particularly favorable because it can be used to prevent any overflow of the liquid either near the wall of the tank or at the border of the glass sheet. The same phenomenon occurs equally in the small spaces which separate consecutive supporting elements along the sides of the tank. The small size of the capillary spaces considerably reduces the surface of molten metal susceptible of being oxidized, so that it is no longer necessary to provide protection by non-oxidizing gases or mechanical coverings to prevent the oxidation of the metal bath.

The spaces are capillary and the meniscus are convex because the molten metal does not wet the glass, or the refractory of the furnace walls, and the adjustable elements, moving the element to clase the gap, causes a lowering of the small meniscus.

A major problem which was solved by this invention was to finely adjust the levels of the elements if the level of the supporting liquid is accidentally modified during the operation of the apparatus.

The above and further objects and novel features of the present invention will more fully appear from the following detailed description when the same is read in connection with the accompanying drawings. It is to be expressly understood, yet, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical transverse section through a furnace for the making of flat glass by the continuous process;

FIGS. 7 and 8 are elevational views partly in section of a preferred form of furnace having movable boundary blocks, advanced controls, and highly developed suspension for the blocks;

FIG. 9 is a perspective view of a detail of the adjusting mechanism of FIGS. 7 and 8;

FIGS. 10 and 11 are transverse, vertical sectional views through modified forms of movable boundary blocks.

Figure 1:
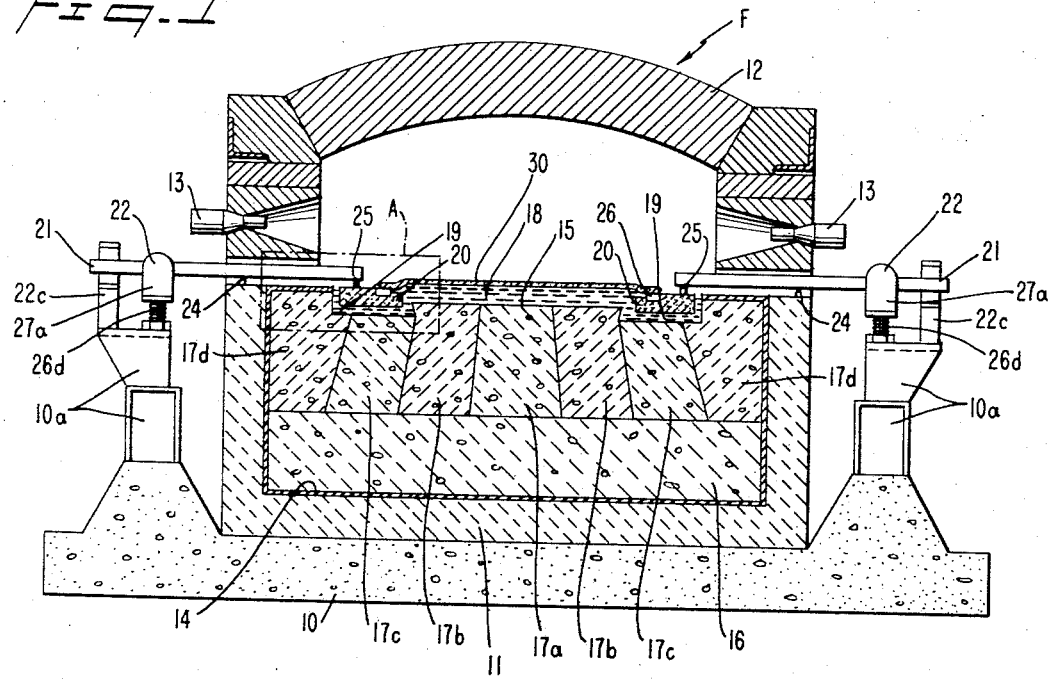
Figure 2:
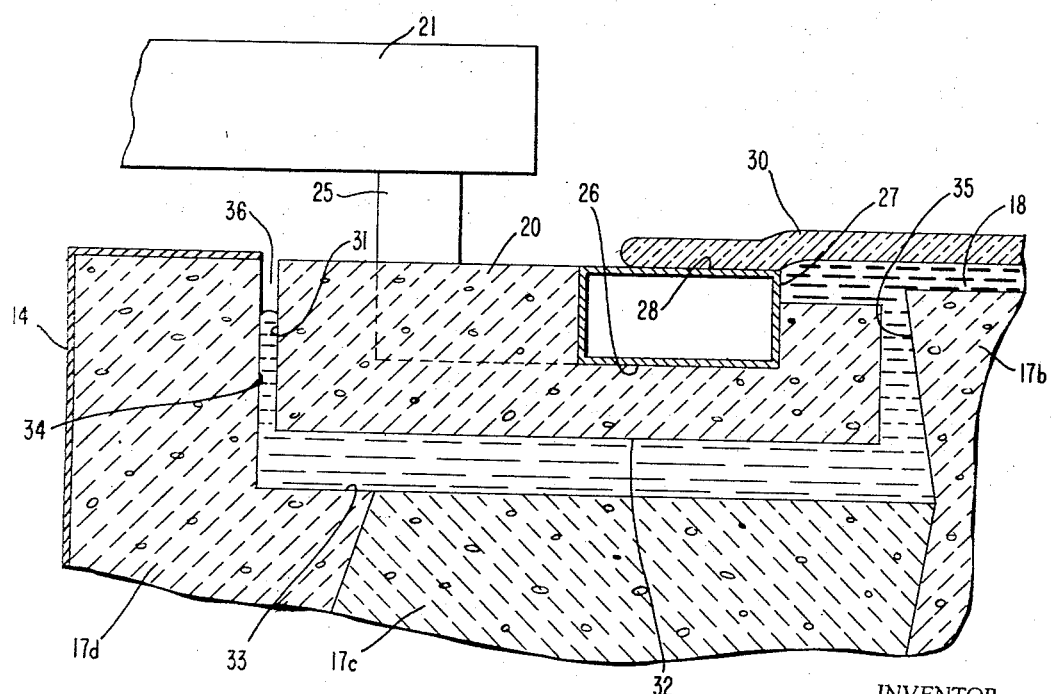
FIG. 2 is an enlarged detail of the area within dashline A of FIG. 1.

Referring now to FIGS. 1 and 2, the concrete base 10 supports a refractory shell 11 of a furnace F which has a vault 12 constructed in some usual way and provided with a series of burners 13 arranged in an adequate pattern to heat the space within the vault to the operating temperatures of the process. These burners are individually variable in order that the temperature may be varied from zone to zone of the furnace. Such construction is known.

Within the concrete base 10 is a metal shell 14 which encloses a recessed tank 15 of novel construction. The tank may be composed of typical glass furnace refractory capable of withstanding the corrosive effect of hot metal and hot glass and it may be in one or several pieces, the construction indicated in the drawing having notable advantages. In that construction a lower block 16, horizontally placed, supports a series of vertical blocks, 17a, 17b, etc., which are splayed outwardly and downwardly. The upper part of the metal shell 14 is brought inward above the outer blocks 17d and secures them firmly in position. Because they are undercut and the inner blocks are splayed all blocks are firmly secured.

The upper surface of the blocks is recessed to provide a shallow receptacle which receives molten metal 18. Adjacent the longitudinal or side edges of this tank there are provided troughs 19 which extend along the tank and serve to receive movable boundary blocks 20. The construction of these boundary blocks will be more fully treated in connection with FIG. 2.

Mounted on the base 10 are supports 10a which support tubes 21 in universally adjustable mounts 22. As such mounts are known they will not be further described except to say that each tube is operably received in a bearing within support 22a which can be elevated by and turned about a support 22b and fixed in any position by a locking member 22c which is movable to any position to which the tube 21 is moved. The tube 21 passes through an aperture 24 of the wall of the furnace and is connected by a tube 25 which is connected to a metallic conduit 26 set in the refractory block 20 and has a near face 27 which is exposed to the molten metal 18 in the tank.

The boundary block 20 is supported by two tubes 21, one adjacent each end, which are interconnected by conduits 25 and the metal conduit 26. The upper face of the conduit 26 is machined or otherwise dressed to provide a smooth bearing surface 28 which receives the edge of the glass sheet 30. The boundary blocks 20, in manufacture, are molded about two sides and a part of the third side of the conduit 26. The bearing blocks are substantially rectangular and have faces 31, 32 which oppose the bottom 33 of the trough 19 and the side 34. The raised central portion of the tank is undercut as indicated at 35 so that a minimum of molten metal is required and a gap of limited dimensions between the adjacent face of the block is provided at the top. Between opposed faces 31, 34 is a narrow gap 36 into which the metal penetrates, forming a convex meniscus of capillary properties, the level of which depends upon the size of the gap. The molten metal and the boundary blocks are preferably nonwetting so that the height of the metal in the gap 36 will be lowered as the size of the gap is reduced and raised as the gap is widened. The metal of the conduit 26 and the molten metal are preferably nonwetting so that the meniscus 37 can be raised above the level of the bearing surface 28 without having the molten metal overflowing that surface. By thus raising the meniscus 37 above the surface 28 all danger of marking the lower surface of the glass by the corner of the conduit 26 is avoided. As the tubes 21 are given universal movement, the level of the block 20 and its position longitudinally, transversely, and vertically can be adjusted as desired. Thus adjustments can be made between the level of the molten metal and the level of the boundary block by adjusting the tubes 21 within the limits permitted by the apertures 24.

In manufacturing glass sheet by the apparatus of this invention a sheet of glass is formed by some known method, for instance by shaping it between rollers, its edges being laid on the bearing surfaces of the boundary blocks, and its center on the major meniscus of the molten metal between the blocks. It is then drawn or propelled along the furnace, undergoing the series of heat treatments necessary to level and fire polish its surfaces and to cool it down from a liquid to a plastic state. It is liquid as cast and capable of self-leveling and fire polishing at its casting temperature, which is maintained at the head end of the furnace. A typical viscosity for this part of the process is $10^3$ poises. After having been leveled and fire polished it proceeds to other portions of the furnace where it is stiffened to a point where it can be handled by ordinary handling machinery, such as rollers, without marring its surface.

The boundary blocks can be constructed one to a side or several to a side, the latter being preferred because it permits individual adjustment for different zones of the furnace. Furthermore, different temperatures can be maintained in the conduits 26 of each block, providing extremely accurate control of the physical state of the edges of the sheet.

The molten metal tends to make its way downward between the blocks 17 and to form a pool between them and block 16 but any tendency of the blocks to float is offset by the splayed construction of the blocks 17 and the fixing of the blocks 17d in their positions.

Figure 3:
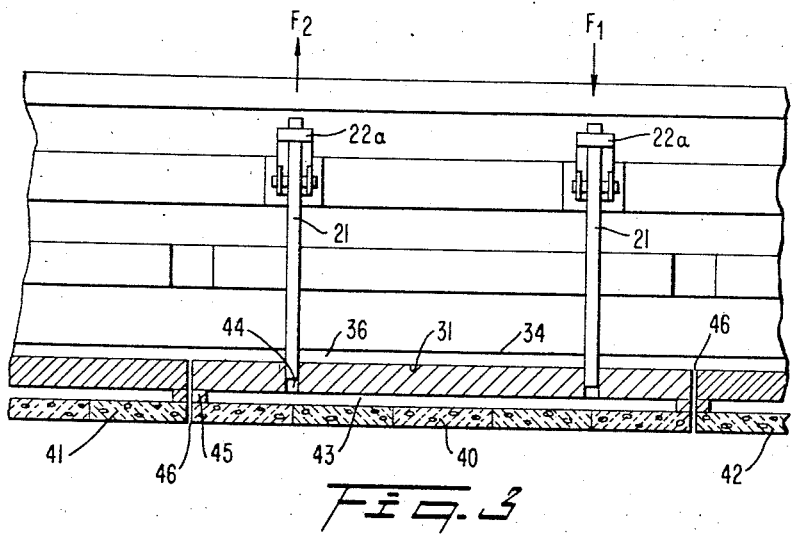
FIG. 3 is a plan view partly in section of a modified form of boundary block.

In FIG. 3 the tubes 21 are shown supported by 22a, arrows F1, F2 showing the flow of cooling water to one block 40 of modified construction. The ends 41, 42 of adjacent blocks, which are similarly supported, are also shown. These blocks are of different construction than those of FIGS. 1 and 2, being composed of refractory cement in which a cooling passage 43 extends from end to end which is connected to the tubes 22a by ports 44. Plugs 45 seal the ends of these passages and capillary gaps 46 are provided between the ends of the blocks. By moving the blocks toward the wall 34 the capillary gap 36 can be reduced and by moving the blocks toward or away from one another adjustments can be made in the width of the gaps 46 producing a change in the level of the meniscus at that vicinity.

Figure 4:
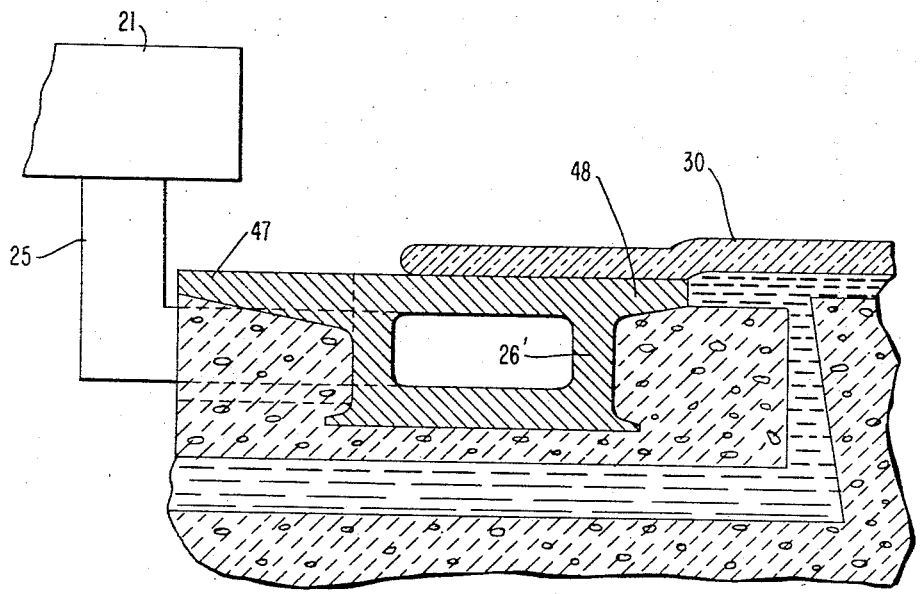
FIG. 4 is another modification of boundary block.

In FIG. 4 is shown a modification in which the conduit in the boundary block is a metal casting, for instance iron carbide, with a dressed upper surface to receive the edges of the glass, and outer and inner projecting flanges 47, 48. The conduit 25 extends into the cement of the block and is connected to the central conduit in the casting.

Figure 5:
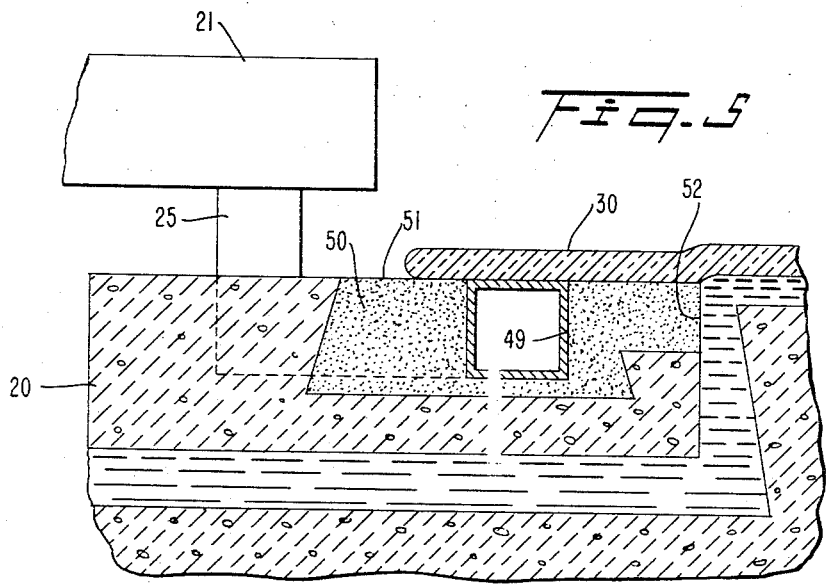
FIGS. 5 and 6 are further modifications of the boundary block, FIG. 6 showing driving means for the sheet in elevation.

Another modification is shown in FIG. 5 wherein the conduit 49 is centrally impressed in a graphite block 50 with its upper face exposed and dressed level with the dressed face 51 of the graphite. In this form of the invention the face 52 of the graphite block is in contact with the molten metal and direct contact is not had between conduit 49 and the molten metal.

Figure 6:
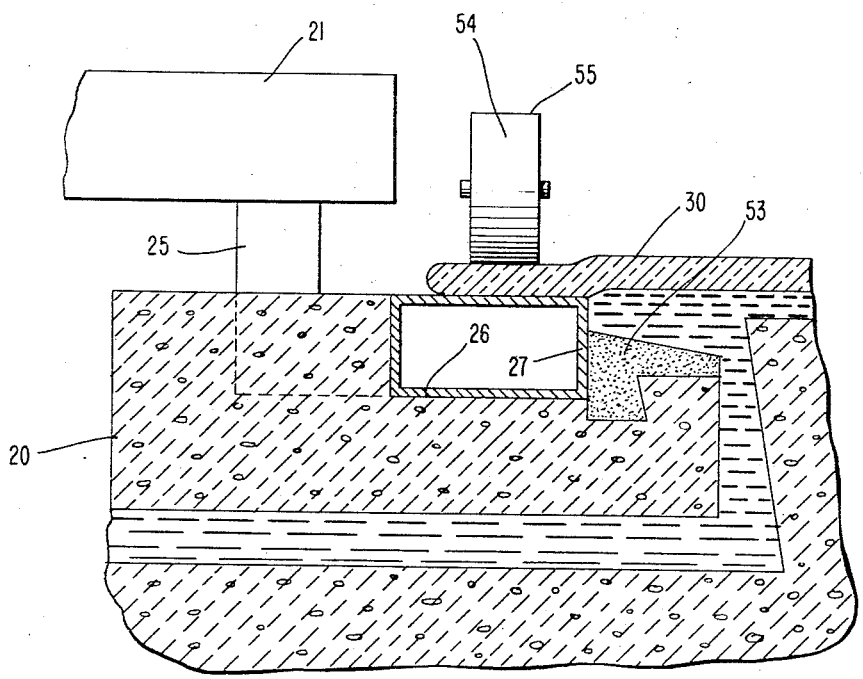

In the modification of FIG. 6 the block 20 has an inset edge piece 53 of graphite which abuts a portion of the wall 27 of the conduit 26. As the heat conductibility of the graphite is different from that of the refractory cement, this construction permits one to establish a different temperature relationship between the conduit and the molten metal than is provided by the structure of FIG. 2. In this figure there is also indicated a wheel 54 having a broad, flat rim 55 which engages the edge of the glass sheet above the bearing face of the conduit 26. A similar wheel is placed over the opposite edge of the glass sheet and, when driven at the same peripheral speeds, these wheels not only move the sheet but compensate for any tendency to transverse distortions that might be caused by the difference in frictional resistance of the bearing surface compared to the meniscus which supports the center of the sheet. As many of these wheels can be employed as is desirable. They may also be omitted, the movement of the sheet being derived from apparatus of the usual kinds adjacent to the end of the furnace.

Modifications are shown in FIGS. 10 and 11, in the first of which the conduit involves a metal channel 60 filled with copper grains 61 which surround the conduit 62, extending lengthwise along the channel between pipes 63 which connect it with conduits 64 which extend through the boundary block and are in communication with supplies of cooling fluid. The channel members 60 are sealed by cap pieces 65. This construction has the advantage that any degree of heat transfer can be established between the inner conduit 62 and the channel 60 by changing the nature of the filler 61. In one situation this filler can be copper grains and in another it can be granular insulation providing only for slow heat exchange.

In FIG. 11 a metal bar 66 of substantially rectangular section is set in the refractory boundary block 20, a lip 67 providing secure anchorage. Within this block is an angle piece 68, of graphite or the like, which is in contact with the cooling fluid in conduit 69. In this case the cooling of the edge of the glass sheet is limited to that which can be accomplished by heat exchange through the metal bar.

According to the concepts of FIG. 7 the boundary block 70 is composed of relatively light refractory cement, the specific gravity of which, computed with the spaces within the conduits 71, 72 and 73 (not shown), establishes an average density less than that of the metal and causes the block to float. The conduits 71, 73 receive the supply of cooling fluid from a feeder pipe 74 which is clamped to a saddle 75 and is connected at 76 to a flexible hose. This mount provides horizontal adjustability. The saddle 75 is pivotally mounted on an arm 77 by pivot 78 which is mounted in a standard 79. An adjustable connection 80 between the end of the arm 77 and a part of the standard 79 enables the arm to be adjusted in any desired position within the range of adjustment provided by connection 80. The standard 79 is appropriately connected to a frame member 81 by means of slots 82, 83 which provide the standard with vertical adjustability. A horizontal flange 84 carries a set screw 85 which bears against the bottom of the I-beam 81, serving as an abutment and a means to control the position of standard 79. The slots permit the standard and block 70 to be adjusted in height and the arm 77 permits it to be leveled.

The metal in the capillary gap 36 is advantageously solidified when the apparatus is operating to prevent any oxidation of the molten metal by the air. To this end a metallic box 86 is set into the refractory wall of the furnace at the general level of the meniscus in the gap. The box contains a conduit 87 through which water is passed by means of connecting tubes of which one, 88, is shown after the position of the element has been adjusted.

FIG. 8 shows a modification of the invention of FIG. 7 in which a counterweight 90 is suspended from the pipe 74 as a counterbalance to the buoyancy of the boundary block. The vertical adjustability of the standard 79 is obtained in substantially the same way except that the locking connection member 80 is shown connected to another frame member.

FIG. 9 shows a detail of the locking adjustment for the pivot arm 77. The screw threaded post 80 has a screw threaded collar 91 which bears upon a block 92 the edge of which are fixed in a fork on the end of arm 77. By adjusting the position of the collar 91 on the box the block may be raised or lowered, the weight 90 being made sufficient to counteract all buoyancy.

The space between the blocks and the wall is so small that, by reason of surface tension, a difference of level will appear between the meniscus at the wall and the level of the supporting liquid. This situation is particularly favorable because it prevents the liquid from pouring over the edge of the tank either outwardly or inwardly. The same phenomenon also occurs in the space between the ends of adjacent blocks. It is also true that the smallness of this space greatly reduces the surface of the metal bath to oxidize, and that the oxide, if it should appear in small quantities, is trapped between the two walls and does not engage the glass. It is also to be noted that the glass completely covers the central meniscus and protects it from oxidation. These facts establish a condition in which the permanence of satisfactory conditions of flow within the tank and uniformity of treatment are assured.

Another important advantage relates to the maintenance of temperature. The blocks are independently controllable in temperature and this makes it possible to vary the temperature from place to place along the length of the edges of the glass. This has the great advantage that the edges of the glass can be made plastic while the center is still liquid and this has the sequential advantage that the relatively hard edges oppose any tendency of the sheet to contract laterally.

It is also a part of the invention to use elements composed of different materials of which a thick portion, in contact with the bath, is composed of a thermally insulated material which prevents the cooling which is applied to the edges from penetrating into the body of the bed. Thus, as shown in FIGS. 11, 5 and 6, a block of graphite is interposed between the cooling element which affects the edges of the sheet and the body of the liquid.

This furnace has remarkable flexibility with respect to the control of temperature in different parts along its length, making it possible to keep each part of the border at a temperature which is convenient to the process which is proceeding in that place, and to the state of the glass there. It also makes it possible to cool the edges, apart from the central portion of the glass, to a point which enables one to apply traction or a driving force to the ribbon without danger of stretching it. It also makes it possible to reduce the risk of having the edges of the ribbon stick to the solid borders, while at the same time maintaining the liquid part of the sheet at its chosen thickness and opposing the forces of surface tension which tend to establish a sheet of fixed dimensions.

There is known to the inventor a method of making glass sheet wherein moving metallic wires or ribbons are affixed to the edges of the glass to assist in maintaining the dimensions desired. Such means can also be employed in combination with the present invention to accomplish special purposes.

The form of the invention in FIGS. 7 and 8 can be used additionally to prevent the oxidation of the meniscus. After the level of the supporting blocks has been established the cooling tubes in the wall of the gap may be activated even to freeze the metal in the gap, effectually preventing any substantial degree of oxidation, the cooling being stopped to permit the metal to melt again when the level of the supporting blocks is to be changed.

As an example of the conditions which might exist in the furnace when casting a sheet of ordinary soda-lime (window) glass, the leveling zone of the metal bath might be maintained at about 1050° C. and the cooling zone which follows the leveling could be reduced from 1050° C. at its upstream end to 600° C. In the leveling zone, which is the hottest, the cooling of the boundary elements is quite intense, and for this reason the internal conduits may well be provided with a large cross section in order to carry large volumes of cooling fluid. In the cooling zone it is advantageous to use a sequence of different constructions, for instance that of FIG. 10 in one boundary element and that of FIG. 11 in another. Thus, in a furnace having three boundary elements in sequence on each side the hot zone may have a construction similar to FIG. 2, the upstream end of the cooling zone may have a construction similar to FIG. 10 and at the downstream end of the cooling zone the construction may be similar to FIG. 11. In the latter case the metal border elements may sometimes be provided with moderate cooling and sometimes may need no cooling at all.

It will be appreciated that this invention presents a simple and effective way of controlling the manufacture of sheet glass by the flotation process in which reduction in width by surface tension and gravity is controlled by the control of the viscosity of the edges of the sheet, and that this control is more flexible than in any prior process, providing local control throughout the enclosed length of the sheet.

As many apparently widely different embodiments of the present invention may be made without departing from the spirit and scope thereof, it is to be understood that the invention is not limited to the specific embodiments.

What is claimed it:

1. A method of making flat glass by flotation which comprises forming a continuous glass sheet, laying it on and drawing it over a molten bath with its edges supported on solid slides out of contact with the bath, and progressively stiffening the edges of the glass sheet independently of the cooling of the central section of the sheet by progressively cooling such solid slides, the effect of gravity and surface tension on the width and thickness of the sheet being controlled by such progressive, controlled stiffening of the edges of the sheet.

2. In the manufacture of glass by the flotation process according to claim 1 the method in which the central portion of the glass sheet moves upon a molten bath and the edges of the sheet rest out of contact with the bath upon a sequence of solid bearings, the step of locally controlling the temperature of individual bearings of the sequence, thereby providing that the edge of the sheet progress through a sequence of discrete zones of selected temperature.

3. Apparatus for the manufacture of a moving ribbon of fire polished flat glass on a molten liquid carrier comprising a flotation tank, a longitudinally extending solid carrier strip supporting each edge of the glass, each carrier strip being divided into a plurality of relatively movable boundary blocks which are partly immersed in the liquid carrier near the side walls of the tank and are provided with upper bearing surfaces to support the edges of the sheet, individually adjustable mounting and levelling means supporting such blocks for vertical and horizontal movement, and individually controllable heat exchanging means operatively associated with such blocks to control the temperature thereof.

4. Apparatus according to claim 3 in which the boundary blocks are positioned in capillary proximity to the side walls of the tank, being thus capable of establishing by adjustment a difference in level of the liquid contiguous to the tank walls relative to that contiguous to the glass sheet.

5. Apparatus according to claim 3 in which such boundary bar comprises a metal conduit adapted to underlie and support the edge of the glass sheet, and means to flow fluid through the conduit.

6. Apparatus according to claim 5 in which the metal conduit is mounted on and projects above a refractory support, exposing its inner face to the molten liquid in the tank and its upper face to the glass and atmosphere of the tank.

7. Apparatus according to claim 3 in which the boundary bars float in the liquid of the tank and are supported by balance means.

8. A flat glass furnace comprising an elongated tank adapted to hold a molten bath for the support of the glass, a plurality of aligned boundary bars extending along the tank adjacent a wall thereof having upper bearing surfaces for the edges of the flat glass, a conduit in each bar, pivotally mounted conduit means connected thereto and supporting each bar horizontally in capillary relation to the tank, and means to adjust the pivotally mounted conduit means vertically, pivotally, and horizontally.

9. The apparatus of claim 5 including counterpoise means attached to the pivotally mounted conduit means at a distance from the pivot of the pivotal mount.

10. Apparatus according to claim 5 including a conduit set in the tank wall opposite the boundary bar, and means to supply the conduit with cooling fluid.

References Cited

UNITED STATES PATENTS

| 3,223,503 | 12/1965 | Barradell-Smith et al. | 65—65 |
| 3,264,081 | 8/1966 | Pilkington | 65—99 |
| 3,266,880 | 8/1966 | Pilkington | 65—65 |
| 3,317,302 | 5/1967 | Misson | 65—99 |
| 3,337,318 | 8/1967 | Gulotta | 65—65 |

DONALL H. SYLVESTER, *Primary Examiner.*

ARTHUR D. KELLOGG, *Assistant Examiner.*

U.S. Cl. X.R.

65—91, 99, 182, 356